J. W. STOCKER.
PASTING OR GUMMING MACHINE.
APPLICATION FILED FEB. 24, 1908.

974,535.

Patented Nov. 1, 1910.

5 SHEETS—SHEET 1.

Witnesses:

Inventor:
John W. Stocker,
By Burke, Durand & Drury
Attys.

J. W. STOCKER.
PASTING OR GUMMING MACHINE.
APPLICATION FILED FEB. 24, 1908.

974,535.

Patented Nov. 1, 1910.
5 SHEETS—SHEET 3.

Witnesses:

Inventor:
John W. Stocker,

J. W. STOCKER.
PASTING OR GUMMING MACHINE.
APPLICATION FILED FEB. 24, 1908.

974,535.

Patented Nov. 1, 1910.
6 SHEETS—SHEET 4.

Witnesses:

Inventor:
John W. Stocker,
By Buckey Dimond Drury
Attys

J. W. STOCKER.
PASTING OR GUMMING MACHINE.
APPLICATION FILED FEB. 24, 1908.
974,535.
Patented Nov. 1, 1910.
5 SHEETS—SHEET 5.
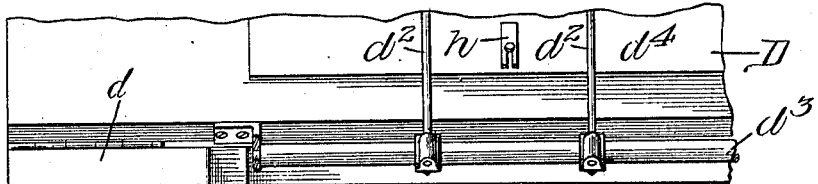
Fig. 9.
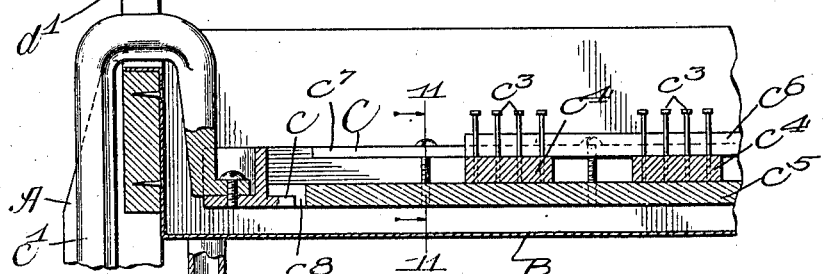
Fig. 10.
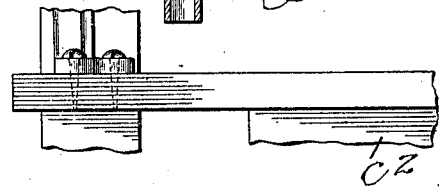
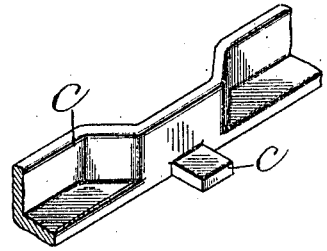
Fig. 11.
Fig. 12.
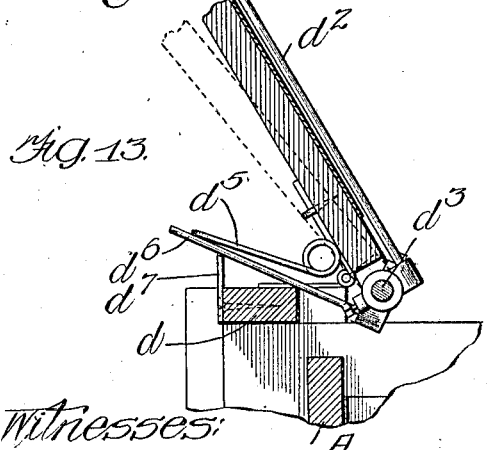
Fig. 13.
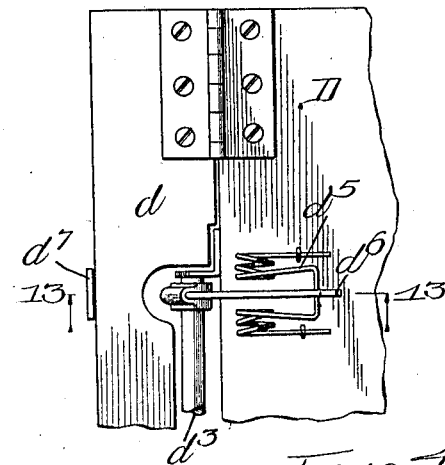
Witnesses:
Inventor:
John W. Stocker,

UNITED STATES PATENT OFFICE.

JOHN W. STOCKER, OF CHICAGO, ILLINOIS.

PASTING OR GUMMING MACHINE.

974,535.  Specification of Letters Patent.  Patented Nov. 1, 1910.

Application filed February 24, 1908. Serial No. 417,277.

*To all whom it may concern:*

Be it known that I, JOHN W. STOCKER, a citizen of the United States of America, and resident of Chicago, Cook county, Illinois, have invented a certain new and useful Improvement in Pasting or Gumming Machines, of which the following is a specification.

My invention relates to pasting machinery, and more especially to machinery of this character for pasting colors on sheets or cards, such as those employed by the manufacturers of different kinds of paint, cards of this kind being ordinarily known as sample cards.

Generally stated, the object of my invention is the provision of an improved and highly efficient machine of this character, adapted for pasting the colors on cards or sheets, of such construction that all of the color strips are pasted on the card or sheet at the same time, as will hereinafter more fully appear.

A special object of my invention is to provide an improved construction and arrangement whereby the machine may be operated by hand, whereby the color strips are easily deposited within the cells or hoppers of the machine, and whereby the member which carries the card or sheet is easily shifted from the paste pot to the set of hoppers which hold the color strips, as will hereinafter more fully appear.

It is also an object, of course, to provide certain details and features of improvement and combinations tending to increase the general efficiency and serviceability of a machine of this particular character.

To the foregoing and other useful ends, my invention consists in matters hereinafter set forth and claimed.

Figure 1:
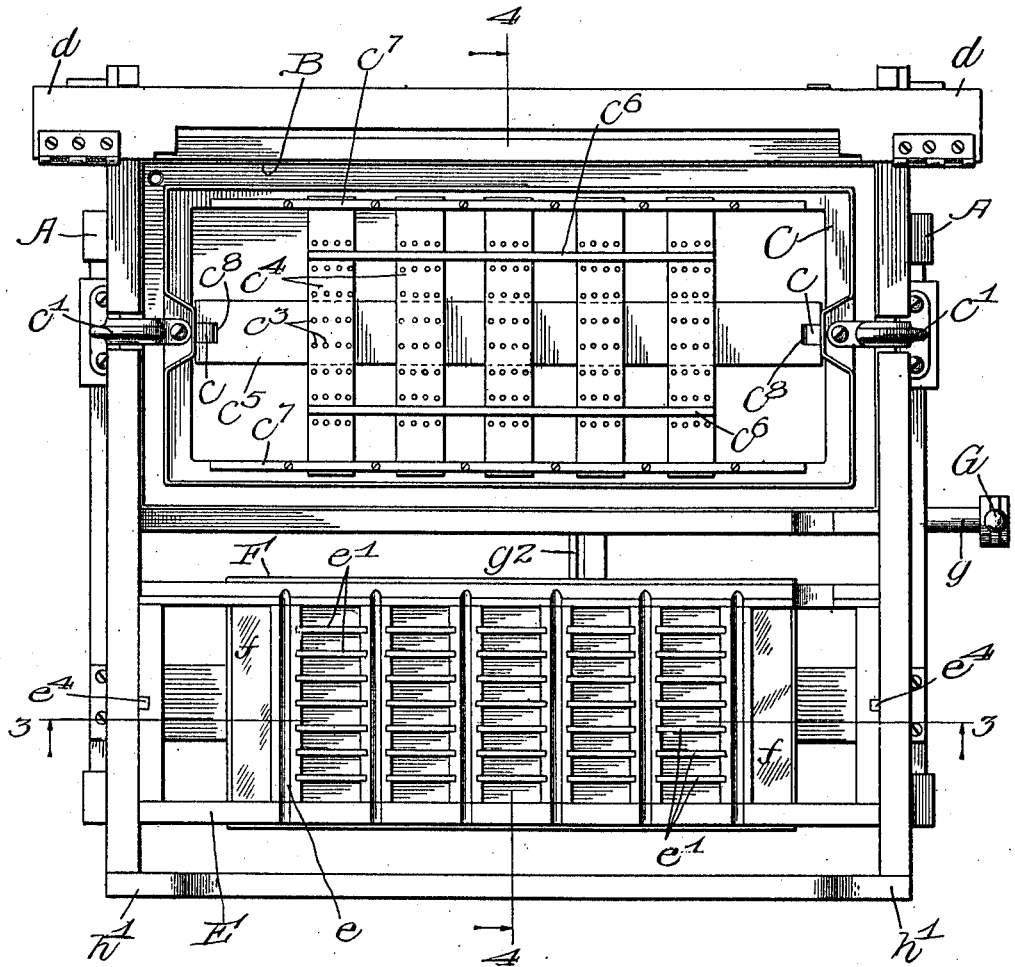
Figure 2:
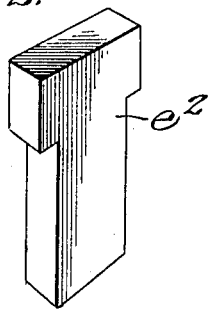
Figure 3:
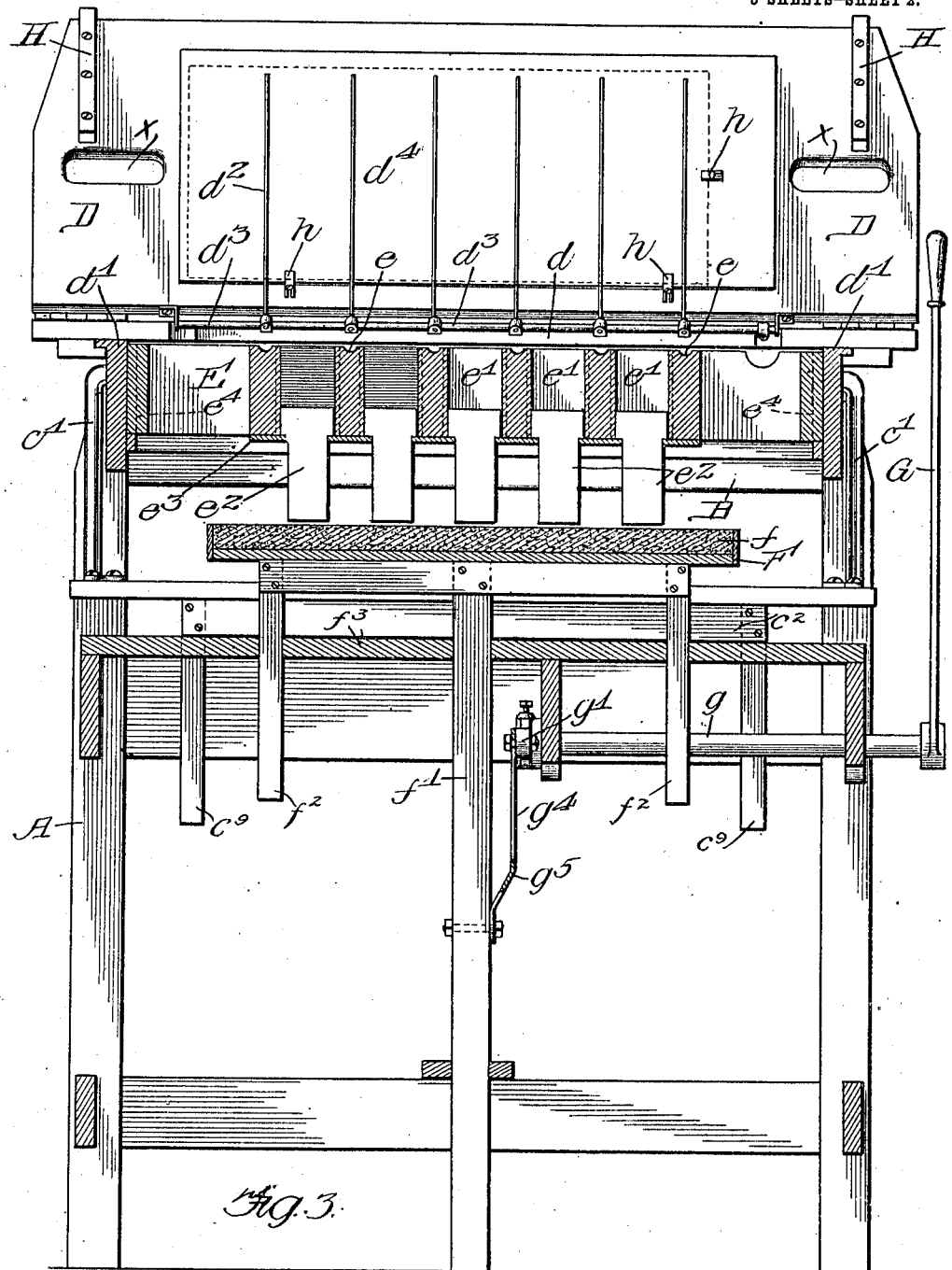
Figure 4:
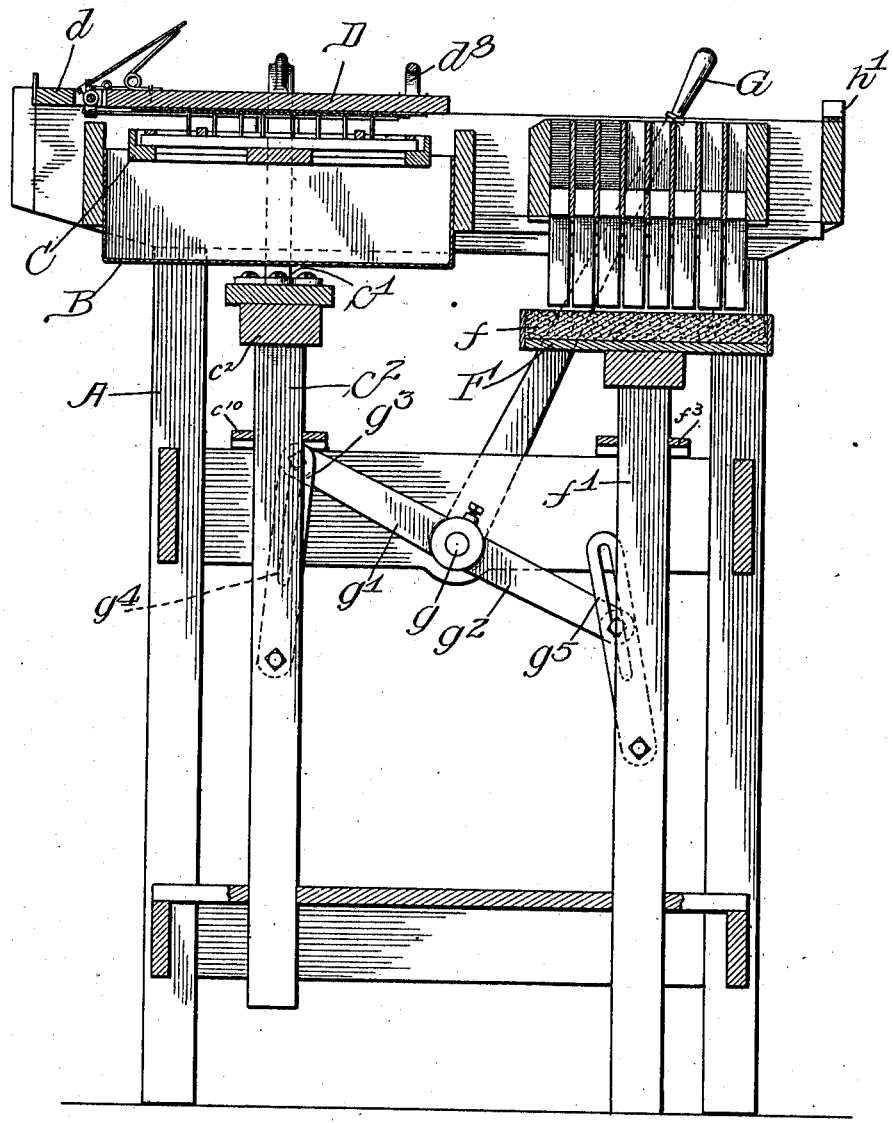
Figure 5:
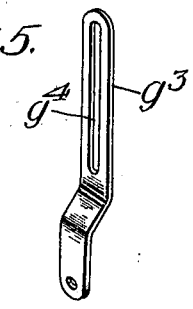
Figure 6:
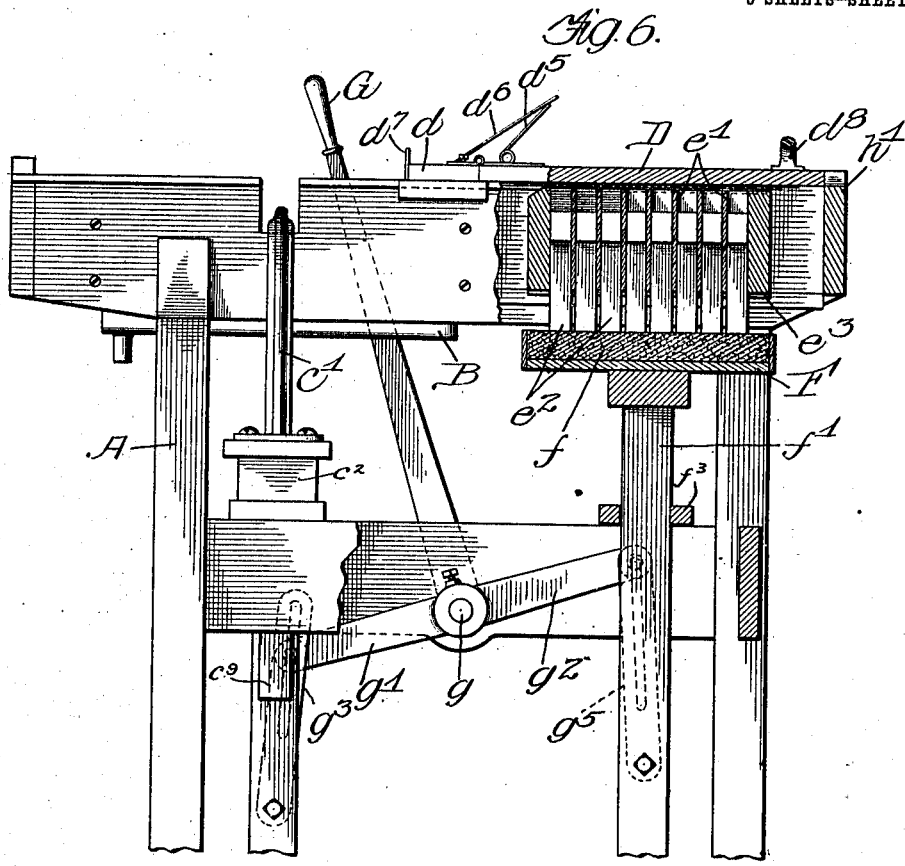
Figure 7:
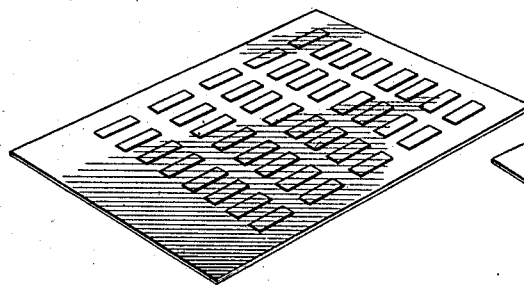
Figure 8:
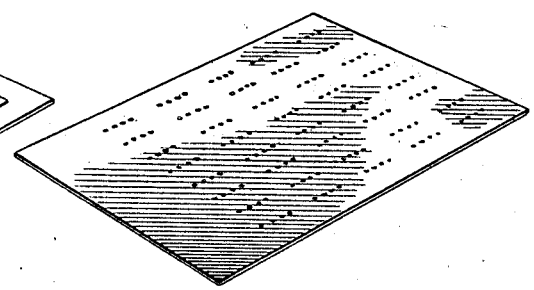

In the accompanying drawings,—Figure 1 is a plan of a pasting machine embodying the principles of my invention, the cover or member which holds the card or sheet of paper being removed to bring into view the devices below. Fig. 2 is a perspective of one of the plungers for the color hoppers. Fig. 3 is a vertical section on line 3—3 in Fig. 1, assuming the hand lever G to be in its middle or intermediate position. Fig. 4 is a vertical section on line 4—4 in Fig. 1. Fig. 5 is a perspective of one of the links employed for connecting the operating lever with the means by which the pasting operation is accomplished. Fig. 6 is a view similar to Fig. 4, but shows the machine in a different position. Fig. 7 is a perspective of one of the completed color cards. Fig. 8 shows the card or sheet upon which the colors are pasted, and illustrates the manner in which the paste is applied. Fig. 9 is an enlarged detail section through one side of the paste pot, showing a portion of the cover or carrier raised into a vertical position. Fig. 10 is a fragmentary perspective of a portion of the frame which carries the daubers by which the paste is applied. Fig. 11 is a detail section on line 11—11 in Fig. 9. Fig. 12 is an enlarged detail plan view of a portion of the cover or card carrier, illustrating one of the spring connections which are applied to the said cover or carrier, and which serve to hold the card or sheet in place upon the bottom of said cover or carrier, through the medium of a plurality of wire fingers, as will hereinafter more fully appear. Fig. 13 is a detail section on line 13—13 in Fig. 12, showing the said cover or card carrier thrown open.

As thus illustrated, it will be seen that my invention comprises an upright frame or body A adapted to support the various operative parts in suitably elevated positions. It will be seen that the upper portion of the frame, at one side thereof, supports a paste pot B, which latter contains a vertically reciprocating rectangular frame C, which latter is provided with end lugs $c$. The said frame is carried by a vertically reciprocating yoke $c^1$, carried by a post or member $c^2$, which latter is mounted to slide up and down in suitable bearings on the frame. The daubers $c^3$ have round heads, being in the nature of nails, and are carried on transverse bars $c^4$, which latter are in turn mounted upon a longitudinal bar $c^5$, and connected together by longitudinal strips $c^6$. The outer clamping strips $c^7$ secure the ends of the bars $c^4$ upon the sides of the frame C. The bar $c^5$ has notches $c^8$ adapted to engage the lugs $c$, in the manner shown, to center the dauber-frame within the vertically reciprocating frame C, in the manner shown.

The card carrier or cover D is hinged to a sliding piece $d$, which latter slides upon the ways $d^1$, said ways being formed on the sides of the frame in any suitable manner.

The wire fingers $d^2$ are secured to the rock shaft or rod $d^3$, which latter is mounted in bearings secured to the said cover. These fingers, it will be seen, are adapted to hold a card or sheet of material upon the under-surface of the said cover or carrier D, which for this purpose is faced with felt or other suitable material $d^4$, in the manner shown. Springs $d^5$ are secured to the top of the cover, and are adapted to bear against the rods $d^6$, which latter are secured to the rock shaft $d^3$. In this way the said springs serve to yieldingly hold the fingers $d^2$ against the under-surface of the cover, in order to hold the card or sheet in place upon the under-side thereof. Stops $d^7$ are provided on the sliding member $d$, and are adapted to engage the rod $d^6$ when the cover is thrown open, as shown in Fig. 13, thus limiting the movement of the fingers $d^2$ when the cover is raised. Owing to the springs $d^5$, however, the cover can be moved a little farther, thus separating the fingers $d^2$ from the cover D, so as to permit the card or sheet to be easily removed after the colors have been pasted thereon. A handle $d^8$ is provided upon the top of the cover, so that the same can be manually shifted along the ways $d^1$ to a point above the hopper structure E, at which point the colors are applied to the pasted card or sheet. It will be seen that this hopper has removable transverse walls $e$ which divide the hopper structure into sections, and that each section is sub-divided by parallel walls $e^1$, as shown more clearly in Fig. 1. There are as many of these sub-sections, each constituting a hopper in itself, as there are colors or thin strips of material to be applied to the pasted surface of the card or sheet. For each small hopper there is a plunger $e^2$, the head or upper end of which normally rests upon the plate $e^3$, as shown more clearly in Fig. 3. A vertically reciprocating bed or plate F is provided with rubber or yielding composition $f$ on the upper surface thereof, and adapted to engage the lower ends of said plungers. The plate F is carried on the upper end of a vertically reciprocating post or member $f^1$, which latter is mounted to slide up and down in suitable bearings on the frame. When the plate F is raised the yielding material $f$ engages the lower ends of said plungers, thus raising the stacks of colors or thin strips of material in their respective hoppers. This causes the uppermost color or thin strip of material in each hopper to be pressed into engagement with the pasted under-surface of the card or sheet, thus causing all the colors or strips of material to be simultaneously applied. It will be seen that each color or strip of material is applied to the points where the round headed daubers have left small patches of paste on the card or sheet, see Figs. 7 and 8, the former of which shows the completed card, and the latter of which shows the method of applying the paste.

The daubers and plungers of the hoppers are operated by a single hand lever G, which latter is pivoted to the frame, at one side thereof, being mounted on a rock shaft $g$ provided with a pair of short arms $g^1$ and $g^2$ extending at right angles to the main lever. The arm $g^1$ is connected to the post $c^2$ through the medium of a link $g^3$, which latter has a slot $g^4$ for giving it a lost-motion connection with the said lever. A similar link $g^5$ connects the arm $g^2$ with the post $f^1$, in the manner shown. With this arrangement, when the lever is rocked to the right, as shown in Fig. 4, the daubers are raised in the paste pot and the plungers are lowered in the hoppers, and the fresh sheet or card on the under-surface of the carrier D is caused to receive the patches of paste on the under-side thereof. Then the operator pulls the cover over to a point above the hoppers, and a shifting of the lever in the opposite direction, as shown in Fig. 6, raises the plungers in their hoppers and causes the uppermost colors or thin strips of material of each stack to adhere to the pasted surface of the card or sheet. It will be seen that with the lost-motion connection intermediate the hand lever and the two vertically reciprocating posts, it is possible to raise either post to the required height without further depressing the other post. In this way the daubers and the plungers can both be depressed, and then the plungers can be raised without depressing the daubers, or vice versa, in the manner illustrated.

It will be seen that the daubers can be easily removed, so as to permit the insertion of different kinds of daubers, according to the shape and size of the color cards. The hoppers can also be changed by removing the frame thereof, so as to receive colors or thin strips of material of different sizes. In this way the machine is adapted to paste the colors on the cards, all of the colors being applied simultaneously, and both operations being accomplished by one and the same hand lever.

It will be seen that the yoke $c^1$ reaches up and over and then down within the paste pot, thus avoiding the necessity of making connection with the dauber-frame through valves or stuffing boxes at the bottom of the paste pot. Consequently there are no devices of this kind to become clogged with paste or gum, and the daubing mechanism is always in condition for operation. The lugs $e^4$ serve to center the hopper-frame within the frame of the machine, and in this way it will be seen that the dauber-frame and the hopper-frame are centered alike, so that the colors will always be applied accurately to the points where the patches of paste or gum have been applied to the surface of the card or sheet. This is of great importance, inasmuch as the colors or thin strips of material must be applied accurately, and very often the slightest deviation from the correct position would result in an inaccurate application of the colors and in a consequent spoiling of the color card. Furthermore, it will be seen that the cover or carrier D is provided with guide pieces H which engage the outer edges of the guides $d^1$, thereby preventing any displacement of the said cover or carrier relative to the daubers and hoppers. It will also be seen that the under-side of the said cover or carrier is provided with gage pieces $h$ which accurately engage the edges of the card or sheet of material to hold the same in place—that is to say, to accurately position the said card or sheet. The ends of the pieces H engage the raised portions $h^1$ on the frame, when the cover or carrier is moved over the hoppers, thus accurately positioning the said cover or carrier above the stacks of colors in the cells of the hopper-frame. Again, it will be seen that the hoppers can be provided in the form of tills or frames or trays that are interchangeable, each frame or till being provided with a set of cells or hoppers, and the cells or hoppers of one frame or till being of different shape or size from those of the other tills or frames. Thus a number of interchangeable dauber-frames can be provided, and also a number of interchangeable hopper frames, whereby color cards having various sizes and shapes of colors can be made, as well as cards each having a different number of colors thereon.

It will be seen that the receptacle B for the paste or gum has an imperforate bottom—that is to say, the bottom thereof is not perforated to permit operative parts and is not provided with any valves, and consequently leakage cannot occur. It will be understood, of course, that the said bottom may be provided with some suitable device for drawing off the contents thereof, but this does not make the bottom perforated in the sense in which the same heretofore have been provided with openings for operative or movable parts, and with valves or stuffing boxes to which parts extend and operate. It is to avoid the use of these boxes and the consequent trouble to leakage that heretofore has existed that I use a bottom that is perfectly tight and free from places where the paste or gum could leak through. Having done this, I then use an arrangement which extends over the sides of the receptacle and downwardly within the same to connect with and operate a dauber-frame, in the manner explained.

It will be seen that the up and down motion of the table or bumper F is guided by the downwardly projecting guide rods or bars $f^2$, which latter work up and down on the stationary table $f^3$. The yoke members $c'$ are also held to a straight up and down motion by similar rods or bars $c^0$ which work up and down in the said stationary table. Thus the vertical motion of the daubers, and of the means for actuating the plungers in the hoppers, is straight and accurate, and no lateral motion is possible.

It will be seen that the yoke members $c'$ rise through the openings X in the swinging cover or member D, when the latter is down in place above the mechanism for applying the paste or glue.

I do not limit myself to the exact construction shown and described, as various changes may be made without departing from the spirit of my invention.

What I claim as my invention is:

1. In a pasting machine, supporting means for holding a card or sheet, means for applying paste to the said card or sheet, devices for shifting the said supporting means horizontally, and mechanism for then applying a plurality of strips of material to the pasted surface of the said card or sheet.

2. In a pasting machine, the combination of means for holding an article, means for applying paste to said article, devices for shifting the said supporting means horizontally, and means for applying a thin strip of material to the pasted surface of said article.

3. In a pasting machine, the combination of a horizontally movable carrier for holding a card or sheet of material, means for applying paste to the undersurface of said card or sheet of material, a set of hoppers over which the said carrier is movable, each hopper adapted to contain a stack of thin strips of material, and means for simultaneously raising the said stacks of strips in their hoppers to apply the uppermost strips to the pasted surface of the said card or sheet.

4. In a pasting machine, the combination of a movable carrier for holding a card or sheet of material, a paste pot, vertically reciprocating means within said paste pot for carrying a suitable quantity of paste upwardly, to apply the same to the under-surface of the said card or sheet, a set of hoppers each adapted to contain a stack of thin strips of material, means whereby the carrier is movable from a point above the paste pot to a point above the said set of hoppers, and plungers for moving the said stacks of strips upwardly to apply the uppermost strips to the pasted surface of said card or sheet of material.

5. In a pasting machine, the combination of a slidable carrier, spring-pressed fingers for holding a card or sheet of material upon the under-surface of said carrier, a paste pot below the path of travel of said carrier, a set of vertically reciprocating daubers within the paste pot, a set of hoppers each adapted to contain a stack of thin strips of material, a plunger for each hopper, and a single hand lever for operating the said daubers and plungers.

6. In a pasting machine, the combination of mechanism for applying paste to a card or sheet of material, a holder for supporting and moving the said sheet horizontally, mechanism for applying thin strips of material to the pasted surface of said card or sheet of material, and a single hand lever operatively connected with each mechanism, whereby each mechanism is operated by the one hand lever.

7. In a pasting machine, the combination of a set of daubers for applying paste to the surface of a card or sheet, a set of plungers for applying thin strips of material to the pasted surface of said card or sheet, a springy or yielding member for engaging the lower ends of said plungers to actuate the same, and means for preventing the plungers from falling down when the said springy or yielding member is disengaged from the lower ends thereof.

8. In a pasting machine, substantially as shown and described, a paste pot, a vertically movable frame therein, said frame provided with end lugs, a plurality of sets of daubers mounted on a frame having end notches adapted to engage said lugs to center the daubers on the said first mentioned frame, and means for applying devices to a card subsequent to the application of paste thereto by said daubers.

9. In a pasting machine, substantially as shown and described, a paste pot, a vertically reciprocating frame therein, a dauber-frame removably mounted on said vertically reciprocating frame, a plurality of sets of daubers mounted on said dauber-frame, for the purpose specified, and means for applying devices to a card subsequent to the application of paste thereto by said daubers.

10. In a pasting machine, substantially as shown and described, a swinging and movable carrier, means for moving the same horizontally, a plurality of fingers for holding a card or sheet of material on the under-surface of said carrier, and spring connections between the fingers and said carrier, whereby the fingers tend to press the card or sheet of material against the under-surface of the said carrier, and the latter is adapted to swing up and down, for the purpose specified.

11. In a pasting machine, the combination of means for applying a coat of paste to the under-surface of a card or sheet of material, hoppers for holding thin strips of material, a hand-operated device for supporting and moving the said card or sheet of material bodily and horizontally to a point above the said hoppers, and hand-operated means for simultaneously applying a plurality of thin strips of material to the coated lower surface of the said card or sheet.

12. The improved pasting machine, comprising hand-operated means for daubing the paste upon an article, devices for supporting and shifting said article horizontally, and means for then applying thin strips of material thereto, substantially as shown and described.

13. In a machine of the character set forth, a receptacle for the paste or gum, a vertically reciprocating dauber-frame within the said receptacle, a vertically reciprocating yoke reaching upwardly and over and down within the said receptacle to engage the said dauber-frame, means for removably securing the ends of the yoke to the dauber-frame, and means for applying devices to a card subsequent to the application of paste thereto by said daubers.

14. In a machine of the character set forth, a receptacle for the paste or gum, a dauber-frame and lugs for centering the same within the receptacle, a hopper-frame, and means for centering the same within the machine, the dauber-frame and the hopper-frame being similarly centered, and means for moving a card or sheet horizontally from above the daubers to a point above the hoppers.

15. In a machine of the character set forth, means for applying paste or gum to the under-surface of a card or sheet, a set of hoppers, a carrier for supporting and moving the card or sheet horizontally from above the daubers to a point above the hoppers, and means for properly positioning the said carrier above the hoppers.

16. In a machine of the character set forth, a frame provided with guides, a carrier slidable along said guides, means for permitting the carrier to be swung up and down, and means on the swinging portion of said carrier for engaging said guides.

17. In a machine of the character set forth, a dauber-frame provided with a plurality of sets of daubers, each set of daubers being provided with a plurality of flat headed nails driven into a block, as set forth, and means for applying devices to a card subsequent to the application of paste thereto by said daubers.

18. In a machine of the character set forth, a receptacle for the paste or gum, said receptacle having an imperforate bottom, a vertically reciprocating member within said receptacle, provided with means for carrying the paste or gum upwardly to apply the same to a suitable surface, vertically reciprocating supports reaching over the sides of the receptacle and down within the same to connect with and operate the said vertically reciprocating member therein, means below the receptacle for rigidly connecting together said supports, and means for applying thin strips of material to any surface to which the paste or gum is applied.

19. In a machine of the character set forth, a receptacle for the paste or gum, said receptacle having an imperforate bottom to prevent leakage, a dauber-frame disposed for up and down movement within said receptacle, a vertically reciprocating bar disposed horizontally below the receptacle, means reaching upwardly from said bar and over the sides of the receptacle and downwardly therein to connect with and operate the said dauber-frame, and means for applying thin strips of material to any surface to which paste or gum is applied.

20. In a machine of the character set forth, a receptacle for the paste or gum, a vertically reciprocating member within said receptacle, provided with means for carrying the paste or gum upwardly to apply the same to a suitable surface, vertically reciprocating supports reaching over the sides of the receptacle and down within the same to connect with and operate the said vertically reciprocating member therein, means outside of the receptacle for rigidly connecting together said supports, movable means above the receptacle for holding a sheet of material in position to receive the paste or gum, and means for applying thin strips of material to any surface to which paste or gum is applied.

21. In a machine of the character set forth, a receptacle for the paste or gum, a dauber-frame disposed for up and down movement within said receptacle, a vertically reciprocating bar disposed horizontally below the receptacle, means reaching upwardly from said bar and over the sides of the receptacle and downwardly therein to connect with and operate the said dauber-frame, movable means above the receptacle for holding a sheet of material in position to receive the paste or gum, and means for applying thin strips of material to any surface to which paste or gum is applied.

22. In a machine of the character set forth, a receptacle for the paste, supports reaching over the sides of said receptacle and downwardly within the same to operate the means for lifting the paste or gum upwardly in sufficient quantities to suitably apply the same to the surface of a card or sheet of material disposed in position above the same, a rigid connection between said supports, means for communicating power to said connections, and means for applying colors to the gummed surface of the card or sheet.

23. In a machine of the class specified, paste-applying mechanism, color-applying mechanism, a single lever for working said mechanisms alternately, and devices whereby movement of said lever beyond certain limits operates one mechanism without disturbing the other.

24. In a machine of the class specified, paste-applying mechanism color-applying mechanism, a single lever for working said mechanisms alternately, and devices whereby movement of said lever within certain limits restores one mechanism to normal without starting the other.

25. In a machine of the class specified, paste-applying mechanism, color-applying mechanism, a single lever for working said mechanisms alternately, and devices whereby movement of said lever within certain limits restores one mechanism without starting the other, and whereby movement of the same beyond said limits operates one mechanism without disturbing the other.

26. In a machine of the class specified, paste-applying mechanism, color-applying mechanism, the latter mechanism comprising a removable cellular tray for the colors, and means supported by the tray to form a bottom for each cell, as set forth.

27. In a machine of the class specified, paste-applying mechanism, color-applying mechanism, an operating lever common to both mechanisms, said paste-applying mechanism comprising a receptacle for the paste, a vertically reciprocating member in said receptacle, arms operatively connected with said lever, said arms reaching over the sides of the receptacle and downwardly therein to connect with and operate said member, and means on said member for carrying the paste upwardly to the lower surface of a card or sheet of material.

28. In a machine of the character set forth, a receptacle for the paste or gum, a bar below the same, a dauber-frame in the said receptacle, means reaching over the sides of the receptacle to connect the said frame with the ends of said bar, means for reciprocating said bar up and down, means for guiding said bar in its up and down motion, to keep the dauber-frame level, and means in conjunction with the foregoing for applying strips of material to any surface to which the paste or gum is applied by the daubers.

29. In a machine of the character set forth, a set of daubers, a box containing said daubers, a bar below the box, connections extending up from the bar and over the sides of the box and down therein to connect with said daubers, a vertical actuating member on which the said bar is carried, guides for the ends of said bar, and means in conjunction with the foregoing for applying strips of material to any surface treated by said daubers.

30. In a machine of the character set forth, a frame, a paste box set in said frame, a set of hoppers also set in said frame, a carrier slidable on the frame from the box to the hopper, and vice versa, said carrier hinged at one edge to swing up at the other edge, daubers in the box, plungers in the hoppers, and means for alternately operating said daubers and plungers.

31. In a machine of the character set forth, a box, a rectangular frame in the box, a dauber frame, means for centering the dauber frame in the said rectangular frame, supports extending up and over the sides of said box and down therein to support said frames, means for rigidly connecting together said supports, means for raising and lowering the same, and means in conjunction with the foregoing for applying strips of material to any surface treated by the daubers.

32. In a machine of the character set forth, a box, a frame therein, a bar below the box, daubers on the frame, and supports rigidly connecting the ends of said bar with the ends of said frame, said supports disposed outside of the box and extending down therein.

Signed by me at Chicago, Illinois, this 12th day of February, 1908.

JOHN W. STOCKER.

Witnesses:
SARAH LEWIS,
E. H. CLEGG.